United States Patent
Liu et al.

(10) Patent No.: US 9,006,370 B1
(45) Date of Patent: Apr. 14, 2015

(54) TRANSPARENT ABRASION-RESISTANT COATINGS FOR PLASTIC SUBSTRATES AND WATER-BASED METHOD TO PREPARE SAME

(71) Applicants: Jiong Liu, East Brunswick, NJ (US); Kenneth Eberts, Westfield, NJ (US)

(72) Inventors: Jiong Liu, East Brunswick, NJ (US); Kenneth Eberts, Westfield, NJ (US)

(73) Assignee: NEI Corporation, Somerset, NJ (US)

( * ) Notice: Subject to any disclaimer, the term of this patent is extended or adjusted under 35 U.S.C. 154(b) by 52 days.

(21) Appl. No.: 13/762,572

(22) Filed: Feb. 8, 2013

Related U.S. Application Data

(63) Continuation-in-part of application No. 12/835,093, filed on Jul. 13, 2010, now abandoned.

(51) Int. Cl.
  *C08G 77/14* (2006.01)
  *C09D 5/00* (2006.01)

(52) U.S. Cl.
  CPC ........................................ *C09D 5/00* (2013.01)

(58) Field of Classification Search
  USPC ............................................................ 528/27
  See application file for complete search history.

(56) References Cited

U.S. PATENT DOCUMENTS 6,423,128 B1 * 7/2002 Amberg-Schwab et al. ........................ 106/287.13

* cited by examiner

*Primary Examiner* — Kuo-Liang Peng
(74) *Attorney, Agent, or Firm* — William L. Botjer

(57) ABSTRACT

Optically clear abrasion (or scratch) and chemical-resistant coatings for use on plastic surfaces and methods for making the coating. These coatings can also be used on metallic substrates for improving their hardness and anti-corrosion (or barrier) properties. The coating composition includes at least one silane which has at least one non-hydrolyzable radical containing an epoxy group, at least one aluminum alkoxide, at least one hydrolyzable silicon compound, at least one acid, and water. The coating composition is a molecular composite formulation and is free from particulate materials.

8 Claims, 1 Drawing Sheet

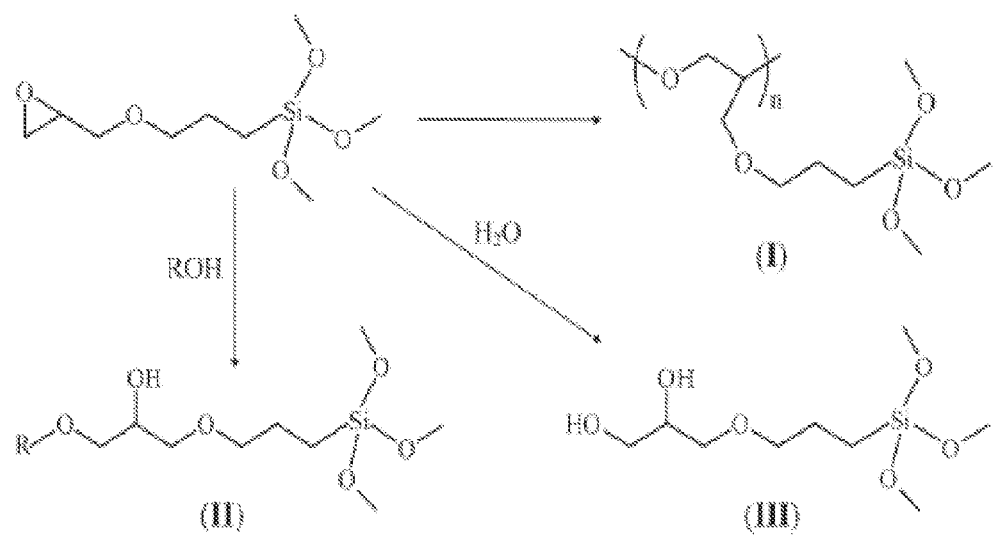

TRANSPARENT ABRASION-RESISTANT COATINGS FOR PLASTIC SUBSTRATES AND WATER-BASED METHOD TO PREPARE SAME

CROSS REFERENCE TO RELATED APPLICATIONS

This application is a continuation in part of U.S. patent application Ser. No. 12/835,093 filed Jul. 13, 2010, the disclosure of which is hereby incorporated by reference.

BACKGROUND OF THE INVENTION

This invention relates to transparent coatings and methods to prepare the coatings. More specifically, this application relates to optically clear abrasion (or scratch) and chemical-resistant coatings for use on plastic surfaces. These coatings can also be used on metallic substrates for improving their hardness and anti-corrosion (or barrier) properties.

The present invention fulfills the need for abrasion or scratch-resistant coatings on plastic substrates, which are needed in a variety of applications such as, ophthalmic and sportswear lenses, automobile and airplane windows. Plastic substrates, such as polycarbonate and acrylic, can scratch easily and lose transparency quickly during daily use and maintenance. Hard and optically transparent coatings for plastic substrates possess significant market potential. To date, however, a totally successful abrasion-resistant coating technology is not yet available.

Optical transparent coatings on polymeric substrates have been developed using two approaches: wet chemical methods (e.g., sol-gel processes), and vacuum/gas phase processes. The latter approach is based on the deposition of an inorganic material by a plasma torch. Using this approach, high abrasion resistance can be obtained, but in addition to high cost, there is often the problem of poor adhesion because of the difference in the thermal expansion coefficient of the substrate and the coating. The sol-gel process is an attractive alternative compared to vacuum/gas phase techniques due to its low cost and good coating adhesion. However, the abrasion resistance of the sol-gel derived coating in general is lower than that produced by the vacuum/gas processes. There is still a need to formulate sol-gel based abrasion and scratch-resistant coating compositions exhibiting good abrasion and scratch-resistance properties.

Sol-gel derived hard coatings on polymeric substrates typically involve the synthesis of an organic-inorganic hybrid material. The first step of the sol-gel synthesis process involves the hydrolysis and condensation of molecular precursors such as metal alkoxide, $M(OR)_n$, leading to the formation of a three-dimensionally crosslinked oxide network. Organic groups chemically linked to the alkoxides can be homogeneously incorporated. These alkoxides are organo-substituted silicic acid esters of general formula $R'_n Si(OR)_{4-n}$, where the organofunctional group $R'$ can act as network modifiers if $R'$ is non-reactive; or network formers if $R'$ can react with itself or additional components ($R'$ contains vinyl, methacryl or epoxy groups, for example).

Water is an essential component of the sol-gel synthesis process since the hydrolysis reaction initiates the process. However, metal alkoxide precursors, such as those of aluminum, titanium and zirconium, exhibit a very high reactivity towards water, making polycondensation reactions in homogeneous media almost impossible to control. To overcome this problem, a "CCC" (Chemically Controlled Condensation) method was developed in the 1980s which allows precise control of hydrolysis and condensation rate by in-stiu water generation within the system (see: H. Schmidt, B. Seiferling, G. Philipp, and K. Deichmann, in Ultrastructure Processing of Advanced Ceramics, edited by J. D. Mackenzie and D. R. Ulrich (John Wiley & Sons, New York, N.Y., 1988), p. 651). The CCC method involved a partial hydrolysis and precondensation step where the starting precursors react with a smaller amount of water than the stoichiometric amount required for complete hydrolysis of all the hydrolysable groups employed. U.S. Pat. No. 4,746,366 disclosed a process, based on the CCC method, for the production of scratch-resistant coatings. According to this process, the amount of water employed for the precondensation is introduced by means of moisture-containing adsorbents, water-containing organic solvents or hydrated salts.

U.S. Pat. No. 4,754,012 discloses organoalkoxisilane/metal alkoxide sol-gel compositions prepared by a slightly different process from that in U.S. Pat. No. 4,746,366. An organoalkoxysilane is firstly partially hydrolyzed, reacted with a mixture of metal alkoxides, and the resulting composition is further hydrolyzed and condensed to form an oxide network.

U.S. Pat. Nos. 5,357,024 and 6,218,494 disclose abrasion-resistant coating compositions containing an organoalkoxysilane and a metal alkoxide with at least one alkoxide radical substituted with a chelating ligand. The reactivity of the metal alkoxide was supposedly decreased with the chelating agent so that the hydrolysis could be conducted by addition of a stoichiometric amount of water.

A common feature of the above processes is that the water has to be meticulously controlled so that the precursor solution can only be prepared in the presence of a large amount of organic solvent. This is not desirable from an environmental point of view.

Still other prior art abrasion/scratch-resistant coatings have been described in U.S. Pat. Nos. 5,134,191, 6,228,921, 6,358,612, 6,361,868, 6,737,162, 6,939,908. A common feature in these patents is that submicron or nano-scale sized inorganic particles, such as metal oxide and other ceramic-based particles having a high degree of hardness, were used together with an organic-inorganic hybrid matrix. These coatings are categorized as a "nanocomposite" in which the inorganic particulate materials (e.g., nanoparticles) are embedded in a coating matrix as a separate phase. The inorganic particulate materials, which provide the functional performance of abrasion resistance, are an essential component of the coating compositions. However, the high surface reactivity of the small particles can lead to aggregation or increased viscosity of the precursor so that the stability in storage (both shelf life and pot life) becomes an issue. Other disadvantages associated with the use of particulate materials include high cost, difficulty in maintaining a high degree of homogeneity, complicated processes involving extra steps for dispersing the particulate materials and/or removing residual insoluble particulates in the final coating composition.

In contrast to the above prior art processes, Liu and Berg (J. Liu and J. C. Berg, *J. Mater. Chem.*, 2007, 17, 4430, hereafter the Liu publication) reported a water-based sol-gel process (hereafter the Liu process) that can be used to prepare abrasion-resistant coatings. This process involves an aqueous precursor solution prepared by adding water into a mixture of an epoxy functional organosilane with an aluminum alkoxide. The alkoxide is then hydrolyzed and the resultant hydrate is peptized to a clear transparent solution. This solution leads to a molecular composite that contains no nanoparticles and yet possesses mechanical properties better than those of a nanocomposite. Uniquely, the Liu process involved simple mixing steps and allowed the use of a large excess of water as the solvent, which is desirable from both the cost and environmental points of view.

While the water-based process is advantageous, there is an inherent drawback for coatings based on the Liu process. According to the Liu publication, the chemistry of the subject precursor involved several ring-opening reactions of the epoxide group in the organosilane. The opened epoxide can convert to poly(ethylene oxide) (Reaction I), alkyl ether (Reaction II), and diol (Reaction III) (See FIG. 1). Reaction I is a self-polymerization reaction that occurs upon drying, which leads to a high degree of cross-linking of the derived coating and is responsible for the good abrasion resistance. Reactions II and III, on the other hand, are not wanted, as their products, alkyl ether and diol, do not polymerize by themselves and thus do not participate in network formation. Nevertheless, Reactions II and III are favored in aqueous solution at pH<7, and their reaction rates increase as pH decreases. The natural pH of the final sol-gel solution according to the Liu process was 4-5, although no acid was added in the system. For this reason, the abrasion resistance is limited to a certain extent for the coatings prepared with the Liu process. With a standard abrasion test ASTM D1044 (500 gram load, CS-10F wheel, 500 cycles), the delta haze of a PMMA (poly(methyl methacrylate)) substrate coated with the Liu process was in the range of 6-10%. This level of abrasion resistance, however, is still not satisfactory to meet the requirement for demanding applications such as automobile and airplane windows.

SUMMARY OF THE INVENTION

In view of the foregoing, an objective of the present invention is to provide an improved water-based process that produces transparent surface coatings with excellent abrasion/scratch resistance. The present water-based process is also simple, cost-effective and environmentally friendly, does not involve the use of any particulate materials, and results in coating compositions with a long shelf life. Another objective of the present invention is to provide compositions for such transparent abrasion and scratch-resistant coatings, wherein the compositions are free from particulate materials and lead to a molecular composite coating. The term "molecular composite" used herein refers to a solution or a coating that is molecularly homogeneous and contains one single phase.

The process according to the present invention involves adding at least one acid and at least one hydrolysable silicon compound to an aqueous precursor solution. The said aqueous precursor solution is prepared by adding a large excess of water into a mixture comprising at least one epoxy functional organosilane and at least one aluminum alkoxide and thereafter mixing thoroughly. The hydrolysable silicon compound according to the present invention acts as a crosslinker under an acidic condition. With the addition of the acid(s), the pH of the aqueous solution drops from a range of 4-5 to a range of 1-3. The hydrolysable silicon compound(s) is(are) then hydrolyzed and dissolved upon thorough mixing, resulting in a molecularly homogeneous coating solution free from particulate materials. The inventors believe that the present molecular composite coating formulation can eliminate the aggregation and gellation commonly seen in conventional abrasion-resistant coating compositions containing particulate materials, thereby resulting in a much denser coating with improved abrasion resistance.

According to the present invention, it is critical to add the acid(s) into the coating composition so as to create an acidic condition that is conducive for hydrolysis of the hydrolysable silicon compound(s). According to the Liu publication, however, the use of any acids in the composition is not desired, as this will result in a decrease in pH and promote the ring opening reactions (i.e., Reactions II and III in FIG. 1) that do not contribute to the network formation. We have surprisingly found that the abrasion resistance of the coating resulted from the compositions with the combination of acid(s) and hydrolysable silicon compound(s), as disclosed herein, was drastically improved as compared with those without the acid(s) and hydrolysable silicon compound(s), as described in the Liu publication. This result suggests that the strengthening effect of the hydrolysable silicon compound(s) on network formation, which is achieved by adding extra cross-links into the network structure, outweighs the negative effect due to the use of the acid(s).

BRIEF DESCRIPTION OF THE DRAWING

While the preferred embodiments of the invention have been illustrated and described in the drawing to follow, it will be clear that the invention is not limited to these embodiments only. Numerous modifications, changes, variations, substitutions, and equivalents will be apparent to those skilled in the art without departing from the spirit and scope of the invention as described in the claims:

FIG. 1 shows the reaction scheme of an epoxy functional organosilane.

DETAILED DESCRIPTION OF THE INVENTION

The transparent abrasion-resistant coating composition according to the present invention comprises the reaction products of (A) at least one organosilane, (B) at least one aluminum alkoxide, (C) at least one acid, (D) at least one hydrolysable silicon compound, and water.

The organosilane compound (A) according to the present invention has at least one non-hydrolyzable radical containing an epoxide group. Examples of non-hydrolyzable radicals containing an epoxide group include in particular those having a glydidyl or glycidyloxy group. The organosilane compound (A) may have 2 or 3 hydrolysable radicals, preferably 3. Examples of the hydrolysable radicals are halogen, alkoxy, aryloxy, acyloxy and alkylcarbonyl. Alkoxy groups, in particular methoxy and ethoxy, are preferred hydrolysable radicals. A preferable example of compound (A) is 3-glycidoxypropyltrimethoxysilane according to the present invention because it is readily accessible.

The organosilane compound (A) may be used in a pre-condensate form in which the hydrolysable radicals are previously partially hydrolyzed, leading to the formation of oligomers. For example, epoxy functional silane oligomers such as CoatOSil MP 200 silane (commercially available from Momentive Performance Materials Inc.) may be directly used in the coating composition.

The aluminum alkoxide compound (B) according to the present invention has a general formula:

$$Al(OR)_3 \qquad (1)$$

where R is an alkyl group. Examples of compound (B) include aluminum methoxide, aluminum ethoxide, aluminum n-propoxide, aluminum isopropoxide, aluminum butoxide, and aluminum sec-butoxide. Preferable examples of compound (B) are aluminum sec-butoxide, aluminum n-propoxide and aluminum isopropoxide.

The acid compound (C) according to the present invention may be an inorganic acid or an organic acid. Examples of the inorganic acids include hydrochloric acid, nitric acid, sulfuric acid and the like. Examples of the organic acids include methaneosulfonic acid, formic acid, acetic acid, citric acid, oxalic acid and the like. Preferable examples of acid compounds (C) include hydrochloric acid, nitric acid and sulfuric acid.

The hydrolysable silicon compound (D) according to the present invention has a general formula:

$$R^1_n Si(OR^2)_{4-n} \quad (2)$$

wherein $R^1$ and $R^2$ are alkyl or aryl groups, and n is equal to 0, 1 or 2, preferably equal to 0 or 1. In Formula (2), $R^1$ and $R^2$ may be identical or different. Preferable examples of W and $R^2$ include methyl and ethyl groups.

Alternatively, the hydrolysable silicon compound (D) may have a general formula:

$$[(OR^3)_3Si](CH_2)_n[Si(OR^3)_3] \quad (3)$$

wherein $R^3$ is an alkyl or aryl group, and n is equal to 1, 2 or 3, preferably equal to 1.

Preferable examples of compound (D) include tetraethylorthosilicate, tetramethylorthosilicate, methyltrimethoxysilane, methyltriethoxysilane and bis(triethoxysilyl)methane.

The composition according to the present invention preferably comprises the following ratio:

1 mole of component (A),
0.05 to 0.53 mole of component (B),
0.005 to 0.1 mole of component (C)
0.26 to 1.5 mole of component (D), and
10 to 250 mole of water.

The coating compositions according to the present invention, characterized by certain quantitative ratios of the components, resulted in highly scratch-resistant coatings. The coating compositions according to the invention are preferably obtained by a process described in detail below. It is crucial that the mixing of the components follows a certain order, and that the quantities of the components used should fall within the defined ranges.

First, the organosilane component (A) is mixed with the aluminum alkoxide component (B), preferably the component (B) being diluted beforehand with an alcohol to a concentration of 70-90 wt %. A large excess of water is then added, resulting in the formation of a white precipitate. Upon vigorous stirring at 40-80° C., the mixture begins as a slurry, gradually becomes translucent and eventually forms a clear and transparent solution after 0.5-2 hours. The acid component (C) is then added to the above solution to adjust the pH to within a range of 1 to 3. Subsequently, the component (D) is added, and the mixture is mixed thoroughly until a homogeneous solution is formed. Alternately, the order of adding component (C) and component (D) may be reversed. To obtain a stable coating solution, it is critical to maintain the pH of the solution within said range. In addition, the molar ratio of component (C)/component (D) is preferably in a range of 0.02-0.08.

The said preparation process results in a clear and transparent coating composition that is a molecular composite and free from particulate materials. The coating composition may be applied to a suitable substrate either immediately after its preparation or after storing at room temperature for a long time (e.g., up to four years). The coating composition maintains its stability during the storage. This level of stability has not been possible for prior art abrasion/scratch-resistant coating compositions to the best of the inventors' knowledge. The inventors believe that the excellent stability of the coating composition is directly related to the fact that the composition does not contain any particulate materials and thus does not result in particle aggregation, which can eventually lead to sedimentation. Further, by maintaining a very acidic condition (i.e., pH=1-3), the polycondesation reactions in the coating composition are suppressed, which prevents gellation from occurring. Both the sedimentation and gellation problems are commonly seen for conventional abrasion/scratch-resistant coating compositions.

The coating compositions according to the present invention may have a solid content ranging from 5 wt % to 40 wt %, preferably from 10 wt % to 35 wt %. The "solid content" means the total amount of materials that eventually convert to the dry coating in a coating formulation. A coating formulation consists of the solid content and the solvent, which evaporates during the drying of the coating. The said solid content is calculated based on the assumption that all the hydrolysable groups in the coating formulation transform to oxo groups. The solid content of the coating solution may be adjusted by changing the amounts of water used for the formulation, or optionally by adding appropriate amounts of organic solvent if desired.

Upon the use of the composition, conventional additives for coatings may be further added, such as, e.g., leveling agent, colorants, corrosion inhibitors, UV-absorbers and the like.

Application to the substrate is by standard coating techniques such as dipping, spin-coating, brushing and spraying. After flashing the applied coating at room temperature, the coated substrate is cured. Curing takes place preferably in a thermal manner at temperatures within the range of 50 to 200° C. The coating can be applied to a final thickness of about 1 to 20 μm, more preferably 2 to 10 μm.

The choice of substrate materials for coating is unlimited. The compositions according to the invention are suitable for coating transparent thermoplastics, and preferably polycarbonates and acrylics, or for metals or ceramics. In particular, spectacle glasses, optical lenses, automotive and airplane windows may be coated with the compositions obtained according to the invention.

EXAMPLES AND COMPARATIVE EXAMPLES

Table 1 lists the exemplary compositions of abrasion-resistant coating solutions that were prepared with the following procedures.

First, an 80 wt % aluminum sec-butoxide (ASB) stock solution was prepared by diluting the as-received aluminum sec-butoxide (95 wt %, from Alfa-Aesar) in isopropanol. 0.1 mol 3-glycidoxypropyltrimethoxysilane (GPTS, from Gelest Inc.) was then combined with the 80 wt % aluminum sec-butoxide in the amounts indicated in Table 1. An appropriate amount of water was then added, resulting in the formation of a white precipitate. The amounts of water used were determined such that the final coating solutions had solid contents listed in Table 1. Upon vigorous stirring at 50° C., the mixture began as a slurry, gradually became translucent and eventually formed a clear and transparent solution after about 30 minutes. The solution was then cooled to room temperature. After that, nitric acid and thereafter tetraethylorthosilicate (TEOS, from Gelest Inc.), in the amounts shown in Table 1, were added. The mixture was then stirred for about 3 hours before coating application. Coating solutions for comparative examples COM-1 and COM-2 were prepared with the above procedure without adding nitric acid and TEOS.

TABLE 1

Exemplary compositions of abrasion-resistant coating solutions

| Solution ID | Composition of coating formulation | | | | Solid content (wt %) | Δ Haze 500 cycles (%) |
| --- | --- | --- | --- | --- | --- | --- |
| | GPTS (mol) | ASB (mol) | Nitric acid (mol) | TEOS (mol) | | |
| EX-1 | 0.1 | 0.04 | 0.0028 | 0.04 | 25 | 2.2 |
| EX-2 | 0.1 | 0.04 | 0.0014 | 0.04 | 25 | 2.4 |
| EX-3 | 0.1 | 0.02 | 0.0028 | 0.07 | 25 | 1.7 |
| EX-4 | 0.1 | 0.02 | 0.0028 | 0.06 | 25 | 0.6 |
| EX-5 | 0.1 | 0.02 | 0.0028 | 0.06 | 20 | 1.1 |
| COM-1 | 0.1 | 0.04 | — | — | 25 | 7.4 |
| COM-2 | 0.1 | 0.04 | — | — | 30 | 6.6 |

The following procedure was followed to prepare specimens for abrasion testing. A polycarbonate plate (4"×4") was cleaned with isopropanol, and the surface was pretreated with a 1 wt % γ-aminopropyltriethoxysilane solution (solvent is butanol/water 90:10 in weight) by spin-coating at 1200 rpm for 60 seconds. The pretreated polycarbonate was dried at 70° C. for 10 minutes. After cooling it to room temperature, the abrasion-resistant coating solution was applied to the pretreated substrate by spin-coating at 800 rpm for 60 seconds. The coated specimen was dried at 120° C. for two hours.

The abrasion resistance of the coated polycarbonate plate was evaluated using the Taber Test in accordance with ASTM D1044-99. A Taber Industries 5130 abraser with a Calibrase CS-1 OF wheel set was used. Haze was measured with a BYK-Gardner Haze-Gard Plus haze meter according to ASTM D1003. The results of haze increase (Δ Haze) after 500 abrasion cycles are listed in Table 1. Comparative examples COM-1 and COM-2 were prepared in accordance with the Liu process. Examples EX-1 to EX-5 were prepared with the present inventive process. Compared with COM-1 and COM-2, EX-1 to EX-5 showed significantly reduced Δ Haze values after the Taber abrasion test, indicating that the abrasion resistance of the coatings was drastically improved.

The present invention has been described with respect to the above exemplary embodiments. However, as those skilled in the art will recognize, modifications and variations in the specific details which have been described may be resorted to without departing from the spirit and scope of the invention as defined in the appended claims.

What is claimed is:

1. A transparent and abrasion-resistant coating composition comprising the reaction products of:
    (A) 1 mole of at least one organosilane having at least one non-hydrolysable radical containing an epoxide group,
    (B) 0.05 to 0.53 mole of at least one aluminum alkoxide having a general formula $Al(OR)_3$, where R is an alkyl group,
    (C) 0.005 to 0.1 mole of at least one hydrolysable silicon compound,
    (D) 0.26 to 1.5 mole of at least one acid,
    (E) 10 to 250 moles of water, and
    (F) said coating composition being a molecular composite and being free from particulate materials.

2. The coating composition of claim 1, wherein the organosilane of component (A) is used in a pre-condensate form in which the hydrolysable radicals are previously partially hydrolyzed leading to formation of oligomers.

3. The coating composition of claim 1, wherein the aluminum alkoxide of component (B) is selected from a group including aluminum sec-butoxide, aluminum n-propoxide and aluminum isopropoxide.

4. The coating composition of claim 1, wherein the hydrolysable silicon compound of component (C) has a general formula $R^1_n Si(OR^2)_{4-n}$, wherein $R^1$ and $R^2$ are alkyl or aryl groups, and n is equal to 0, 1 or 2.

5. The coating composition of claim 1, wherein the hydrolysable silicon compound of component (C) has a general formula $[(OR^3)_3 Si](CH_2)_n [Si(OR^3)_3]$, wherein $R^3$ is an alkyl or aryl group, and n is equal to 1, 2 or 3.

6. The coating composition of claim 1, wherein the hydrolysable silicon compound of component (C) is selected from a group including tetraethylorthosilicate, tetramethylorthosilicate, methyltrimethoxysilane, methyltriethoxysilane and bis(triethoxysilyl)methane.

7. The coating composition of claim 1, wherein the acid is selected from a group including nitric acid, hydrochloric acid and sulfuric acid.

8. The coating composition of claim 1 having a solid content ranging from 5 wt % to 40 wt %.

\* \* \* \* \*